United States Patent
Tanriover et al.

(10) Patent No.: US 10,112,505 B2
(45) Date of Patent: Oct. 30, 2018

(54) OCCUPANT PROFILING SYSTEM

(71) Applicant: Intel Corporation, Santa Clara, CA (US)

(72) Inventors: Cagri Cagatay Tanriover, Bethany, OR (US); Enno Luebbert Egge Luebbers, Hillsboro, OR (US); Selin Sargut, Istanbul (TR)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 15/271,959

(22) Filed: Sep. 21, 2016

(65) Prior Publication Data
US 2018/0079322 A1    Mar. 22, 2018

(51) Int. Cl.
*B60N 2/02*    (2006.01)
*B60N 2/00*    (2006.01)

(52) U.S. Cl.
CPC ........... *B60N 2/0244* (2013.01); *B60N 2/002* (2013.01); *B60N 2002/0268* (2013.01)

(58) Field of Classification Search
CPC .................. B60N 2/0244; B60N 2/002; B60N 2002/0268
See application file for complete search history.

(56) References Cited

U.S. PATENT DOCUMENTS 5,848,661 A * 12/1998 Fu .......................... B60N 2/002
 180/273
6,345,839 B1 * 2/2002 Kuboki .................. B60N 2/002
 280/735
6,559,555 B1 * 5/2003 Saitou .................... B60N 2/002
 280/735

(Continued)

FOREIGN PATENT DOCUMENTS

KR     1020050027306        3/2005

OTHER PUBLICATIONS

Artan, Yusuf, et al., "Comparison of face detection and image classification for detecting front seat passengers in vehicles", IEEE Winter Conference on Applications of Computer Vision (WACV), (Mar. 2014).

(Continued)

*Primary Examiner* — Frederick M Brushaber
(74) *Attorney, Agent, or Firm* — Schwegman Lundberg & Woessner, P.A.

(57) ABSTRACT

Various systems and methods for providing an occupant profiling system are described herein. A system for profiling a vehicle occupant includes a vehicle control system, comprising: a sensor fusion circuit coupled to a plurality of sensors installed a vehicle seat, the sensor fusion circuit to: determine that a human occupant is seated in the vehicle seat; sample a backrest sensor arrangement and a base cushion sensor arrangement of the vehicle seat to obtain backrest sensor data and base cushion sensor data, when the human occupant is determined to be seated in the vehicle seat; sample, when the human occupant is determined to be seated in the vehicle seat, a height sensor to obtain a height sensor value; and statistically determine from the backrest sensor data, the base cushion sensor data, and the high sensor data, whether the human occupant matches a reference profile.

25 Claims, 7 Drawing Sheets

(56) References Cited

U.S. PATENT DOCUMENTS

| | | | | |
|---|---|---|---|---|
| 6,968,263 | B1* | 11/2005 | Norton | B60R 21/01532 280/728.1 |
| 7,469,924 | B2* | 12/2008 | Theisen | B60R 21/0132 280/735 |
| 7,762,582 | B2* | 7/2010 | Breed | B60N 2/002 180/274 |
| 7,766,383 | B2* | 8/2010 | Breed | B60N 2/002 280/735 |
| 7,962,311 | B2* | 6/2011 | Launay | B60R 21/01532 702/158 |
| 2003/0025310 | A1* | 2/2003 | Jitsui | B60R 21/01516 280/735 |
| 2003/0122782 | A1* | 7/2003 | Yamaguchi | B60R 11/0235 345/158 |
| 2003/0151240 | A1* | 8/2003 | Saitou | B60R 21/01532 280/735 |
| 2007/0116327 | A1* | 5/2007 | Breed | B60N 2/002 382/100 |
| 2008/0080741 | A1* | 4/2008 | Yokoo | B60W 40/09 382/104 |
| 2008/0234899 | A1* | 9/2008 | Breed | B60N 2/002 701/47 |
| 2009/0289780 | A1* | 11/2009 | Tenorio-Fox | B60R 25/04 340/425.5 |
| 2012/0053793 | A1* | 3/2012 | Sala | B60N 2/002 701/45 |
| 2013/0030645 | A1* | 1/2013 | Divine | B60K 35/00 701/36 |
| 2013/0238167 | A1* | 9/2013 | Stanfield | G08G 1/20 701/2 |
| 2015/0045984 | A1* | 2/2015 | Hui | B60R 16/02 701/1 |
| 2016/0379631 | A1* | 12/2016 | Wang | B60N 2/0232 704/275 |
| 2017/0166122 | A1* | 6/2017 | Ando | B60Q 9/00 |
| 2017/0169636 | A1* | 6/2017 | Piche | G07C 9/00142 |
| 2017/0349061 | A1* | 12/2017 | Benson | B60N 2/0244 |

OTHER PUBLICATIONS

Makrushin, Andrey, et al., "Car-seat occupancy detection using a monocular 360° NIR camera and advanced template matching", 16th International Conference on Digital Signal Processing, (Jul. 2009).

"International Application Serial No. PCT/US2017/051795, International Search Report dated Dec. 26, 2017", 12 pgs.

"International Application Serial No. PCT/US2017/051795, Written Opinion dated Dec. 26, 2017", 12 pgs.

* cited by examiner

OCCUPANT PROFILING SYSTEM

TECHNICAL FIELD

Embodiments described herein generally relate to vehicle control systems and in particular, to an occupant profiling system.

BACKGROUND

In many vehicles, various safety and convenience systems may be automatically configured based on an occupant detection system. The driver's seat may be adjusted based on the current driver, for example. Other adjustments to mirrors, seat position, heating and cooling setting, radio settings, and the like may be configured based on the current driver. Other occupants of a vehicle may also have safety or convenience options configured based on an occupant's presence or other characteristics of an occupant. As an example, an airbag may be activated based on whether a person is in a seat protected by the airbag.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Systems and methods described herein provide an occupant profiling system. In order to properly configure a vehicle for a particular person, the person should first be identified with a certain level of confidence. Without this threshold operation, what was designed to be a convenience and safety feature becomes a burden to the vehicle operator or occupants. What is needed is a mechanism for accurately identifying a vehicle occupant.

The disclosure encompasses an occupant profiling system designed for vehicles, such as a car, van, bus, airplane, boat, etc. The system may classify or identify vehicle occupants. The system may be used in conjunction with other vehicle systems to configure various vehicle subsystems. For example, personalized driver settings may be configured. Seat height, mirror position, climate control, and other settings may be altered based on the identified person. Additional subsystems may be configured based on other occupants. For example, when children are in the front seat, an airbag system's operation may be reconfigured to account for the size or weight of the child. As another example, the number and classification (e.g., adult or child) of the occupants may be determined and used to determine optimal safety system configuration, such as seatbelt tension and position, airbag activation timing, or other active and passive safety measures. Other operations that may be implemented with information obtained by an occupant profiling system include, but are not limited to, acquisition of each passenger profile in real-time, identification of passenger safety related risks prior to a journey, provision of security against intrusion into a vehicle, personalization of driving settings and safety systems, and logging of vehicle usage per authorized driver.

Figure 1:
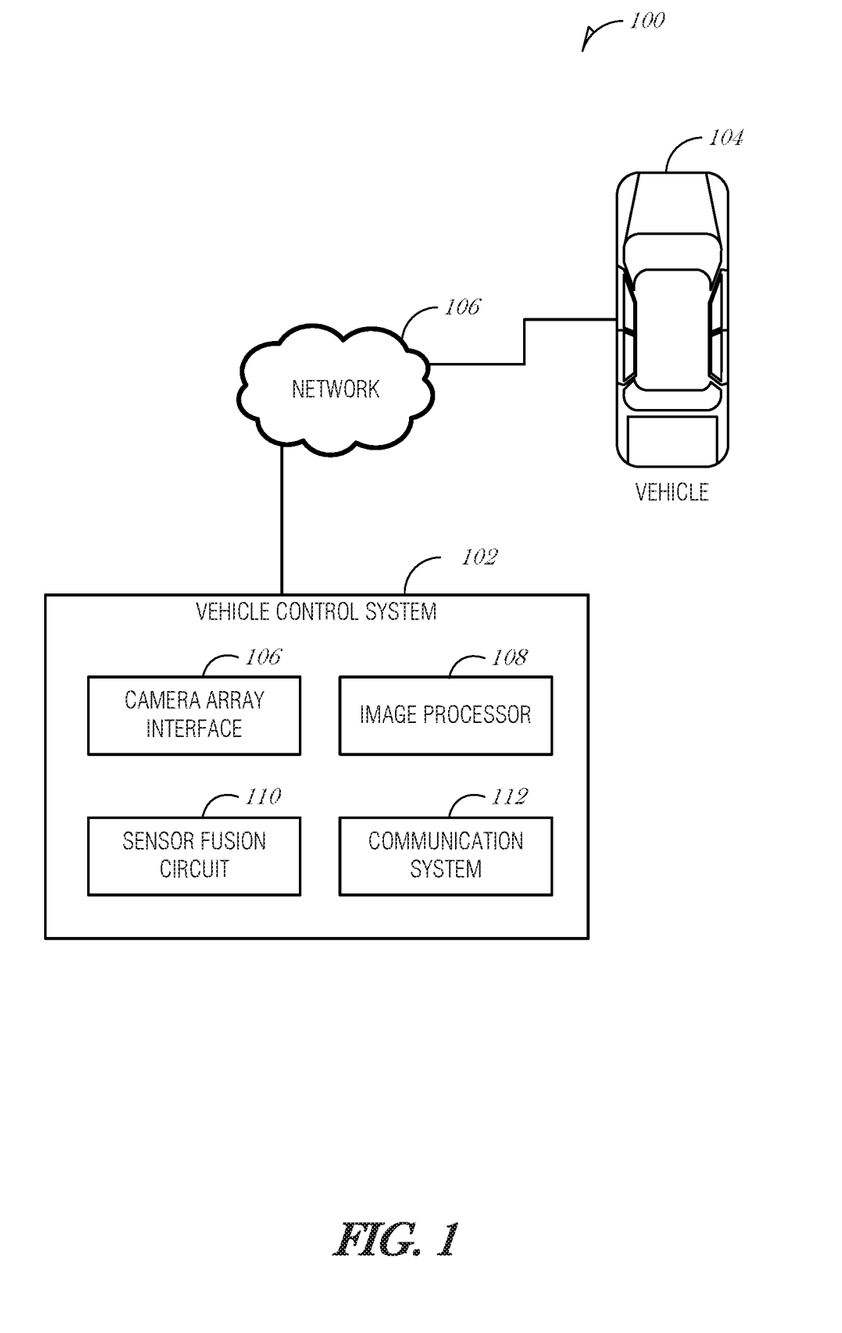
FIG. 1 is a schematic drawing illustrating a system to profile a vehicle occupant, according to an embodiment.

FIG. 1 is a schematic drawing illustrating a system 100 to profile a vehicle occupant, according to an embodiment. FIG. 1 includes a vehicle control system 102 and a vehicle 104, communicatively coupled via a network 106.

The vehicle 104 may be of any type of vehicle, such as a commercial vehicle, consumer vehicle, or recreation vehicle. The vehicle 104 includes an on-board diagnostics system to record vehicle operation and other aspects of the vehicle's performance, maintenance, or status. The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

The network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LANs or WANs, such as the Internet. The various devices (e.g., vehicle control system 102 and vehicle 104) coupled to the network 106 may be coupled to the network 106 via one or more wired or wireless connections. The network 106 may also include in-vehicle networks, such as an on-board diagnostic network (e.g., OBD II), CANbus, Bluetooth (IEEE 802.15.1), or other in-vehicle, short-range, small-area, or personal networks.

The vehicle control system 102 may interface with various sensors installed in or around the vehicle 104. Sensor include, but are not limited to, pressure sensors, optical sensors, ultrasonic sensors, and the like. Sensors may be installed in a seat cushion, seat back, headrest, headliner, dashboard, or other locations in the vehicle 104. The vehicle control system 102 may also interface with an in-vehicle infotainment system to provide information to and receive input from an occupant of the vehicle 104. Additionally, the vehicle control system 102 may interface with various subsystems of the vehicle 104, such as safety subsystems (e.g., seatbelt systems, airbag system, anti-lock braking system, etc.), security subsystems (e.g., intruder alarms), accessory systems (e.g., seat position controllers, audio system controllers, climate control, etc.), or telemetry systems (e.g., navigation system). The vehicle control system 102 may be disposed in the vehicle 104 or in a separate system, such as a mobile phone, a remote server system, a wearable device, or a key fob, for example.

For the purposes of occupant detection and identification, the vehicle control system 102 includes a camera array interface 106, an image processor 108, a sensor fusion circuit 110, and a communication system 112. The camera array interface 106 receives data from one or more cameras installed in the vehicle 104. The cameras may be installed such that each camera is oriented toward one seat of the vehicle 104, or multiple seats may be in-frame of a single camera such that there are fewer cameras used than there are seats. The camera array interface 106 is used to determine whether a person is sitting in a particular seat. The camera array interface 106 may pass information to the image processor 108 to perform image analysis on one or more images or frames of video obtained by the camera array interface 106 from the cameras. In the present system, the image processor 108 is used to determine whether a person is in a seat, but is not used to determine the identity of the person. Thus, the image processor 108 may perform facial detection (e.g., is there any face), which is a less computationally costly operation than facial recognition (e.g., identifying a particular person by their face).

When a person is detected as being in a particular seat, the sensor fusion circuit 110 is used to obtain seat sensor data from the particular seat. Sensors may be incorporated into the base of the seat and the backrest of the seat. As such, the seat sensor data includes two components: base cushion sensor values and backrest sensor values. The sensor fusion circuit 110 may also obtain data from a height detector. The height detector may be situated above the particular seat. Multiple height detectors may be used, one for each seat in the vehicle 104, for example. Additionally, multiple height detectors may be used per seat. For example, a height detector may be an ultrasonic sensor positioned above the seat when the seat is in a middle position (e.g., not slid to the extreme forward or rearward position). When the seat is moved forward or backward, the height detector may not be as accurate, being at an angle to the top of the person's head. As such, multiple height detectors may be used such that when the seat is set forward, a forward positioned height detector is used, and when a seat is set back, a rearward positioned height detector is used. Additional or alternative height detector positions may be used (e.g., one height detector used for stationary seats like those in the back of a sedan, and multiple height detectors used for moveable seats like those in the front of a sedan). Using the seat sensor data and the height detector data, the sensor fusion circuit 110 is able to determine a likely identification of the person.

Thus, in an embodiment, a system for profiling a vehicle occupant includes a vehicle control system 102, which may include a sensor fusion circuit 110 coupled to a plurality of sensors installed a vehicle seat, the sensor fusion circuit 110 to determine that a human occupant is seated in the vehicle seat. In an embodiment, to determine that the human occupant is seated in the vehicle seat, the sensor fusion circuit 110 is to interface with an image processor 108, the image processor 108 coupled to a camera array interface 106 and operable to obtain an image of the vehicle seat and use a facial detection process on the image to determine whether a face is present in the image. In a further embodiment, the image processor 108 is to conditionally use the facial detection process when the base cushion sensor data indicates that more than a threshold weight is on the vehicle seat.

The sensor fusion circuit 110 may be further operable to sample a backrest sensor arrangement and a base cushion sensor arrangement of the vehicle seat to obtain backrest sensor data and base cushion sensor data, when the human occupant is determined to be seated in the vehicle seat.

The sensor fusion circuit 110 may be further operable to sample, when the human occupant is determined to be seated in the vehicle seat, a height sensor to obtain a height sensor value. In an embodiment, the height sensor comprises an ultrasonic sensor. In an embodiment, the height sensor value comprises a distance between the height sensor and an upper portion of the human occupant.

The sensor fusion circuit 110 may be further operable to statistically determine from the backrest sensor data, the base cushion sensor data, and the high sensor data, whether the human occupant matches a reference profile.

In an embodiment, the reference profile comprises a reference backrest sensor data set, a reference base cushion sensor data set, and a reference height sensor data set. In such an embodiment, to statistically determine whether the human occupant matches the reference profile, the sensor fusion circuit 110 is to obtain a backrest confidence value indicating the likelihood that the backrest sensor data corresponds to the reference backrest sensor data set; obtain a base cushion confidence value indicating the likelihood that the base cushion sensor data corresponds to the reference base cushion sensor data set; obtain a height confidence value indicating the likelihood that the seat height sensor data corresponds to the reference height sensor data set; and aggregate the backrest confidence value, the base cushion confidence value, and the height confidence value to obtain a total confidence value. In an embodiment, to aggregate the backrest, base cushion, and height confidence values, the sensor fusion circuit 110 is to aggregate the backrest, base cushion, and height confidence values in a weighted function.

In an embodiment, the backrest sensor data comprises a set of sensor values corresponding to a plurality of sensors in the backrest sensor arrangement. In a further embodiment, to obtain the backrest confidence value, the sensor fusion circuit 110 is to calculate a sum of sums of dot products of the set of sensor values corresponding to the plurality of sensors in the backrest sensor arrangement and a set of sensor values corresponding to the reference backrest sensor data set and compare the sum of sums with a sum of sums of the set of sensor values corresponding to the reference backrest sensor data set with itself.

In an embodiment, the base cushion sensor data comprises a set of sensor values corresponding to a plurality of sensors in the base cushion sensor arrangement. In a further embodiment, to obtain the base cushion confidence value, the sensor fusion circuit 110 is to calculate a sum of sums of dot products of the set of sensor values corresponding to the plurality of sensors in the base cushion sensor arrangement and a set of sensor values corresponding to the reference base cushion sensor data set and compare the sum of sums with a sum of sums of the set of sensor values corresponding to the reference base cushion sensor data set with itself.

In an embodiment, to obtain the height confidence value, the sensor fusion circuit 110 is to calculate a difference of the height sensor data and the reference height sensor data and use the difference to determine the height confidence value.

Figure 2:
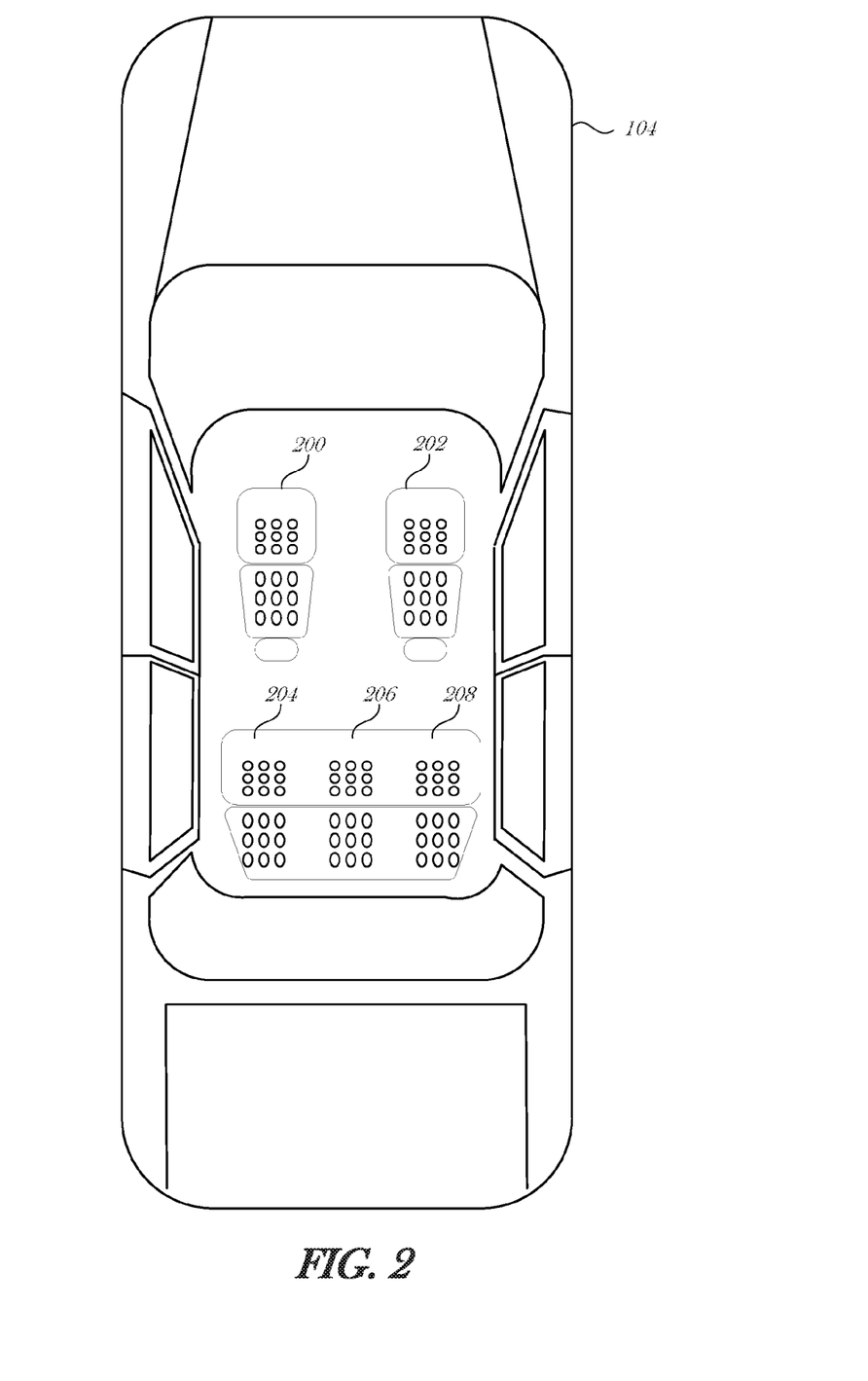
FIG. 2 is a schematic view of a vehicle, according to an embodiment.

FIG. 2 is a schematic view of a vehicle 104, according to an embodiment. The vehicle 104 illustrated in FIG. 2 is a sedan with a conventional five seat arrangement (e.g., two front bucket seats and a rear bench seat able to hold an additional three people). In particular, the vehicle 104 includes a driver's seat 200, a front passenger seat 202, a rear left seat 204, a rear center seat 206, and a rear right seat 208. Each seat 200-208 includes a set of sensors installed in the base cushion and a set of sensors installed in the backrest. In the example shown in FIG. 2, the sensors are arranged as a 3×3 matrix of sensors for each of the base cushion and the backrest. It is understood that more or fewer sensors may be used in the base or the backrest, in one seat versus another seat, or in other configurations or arrangements.

Figure 3:
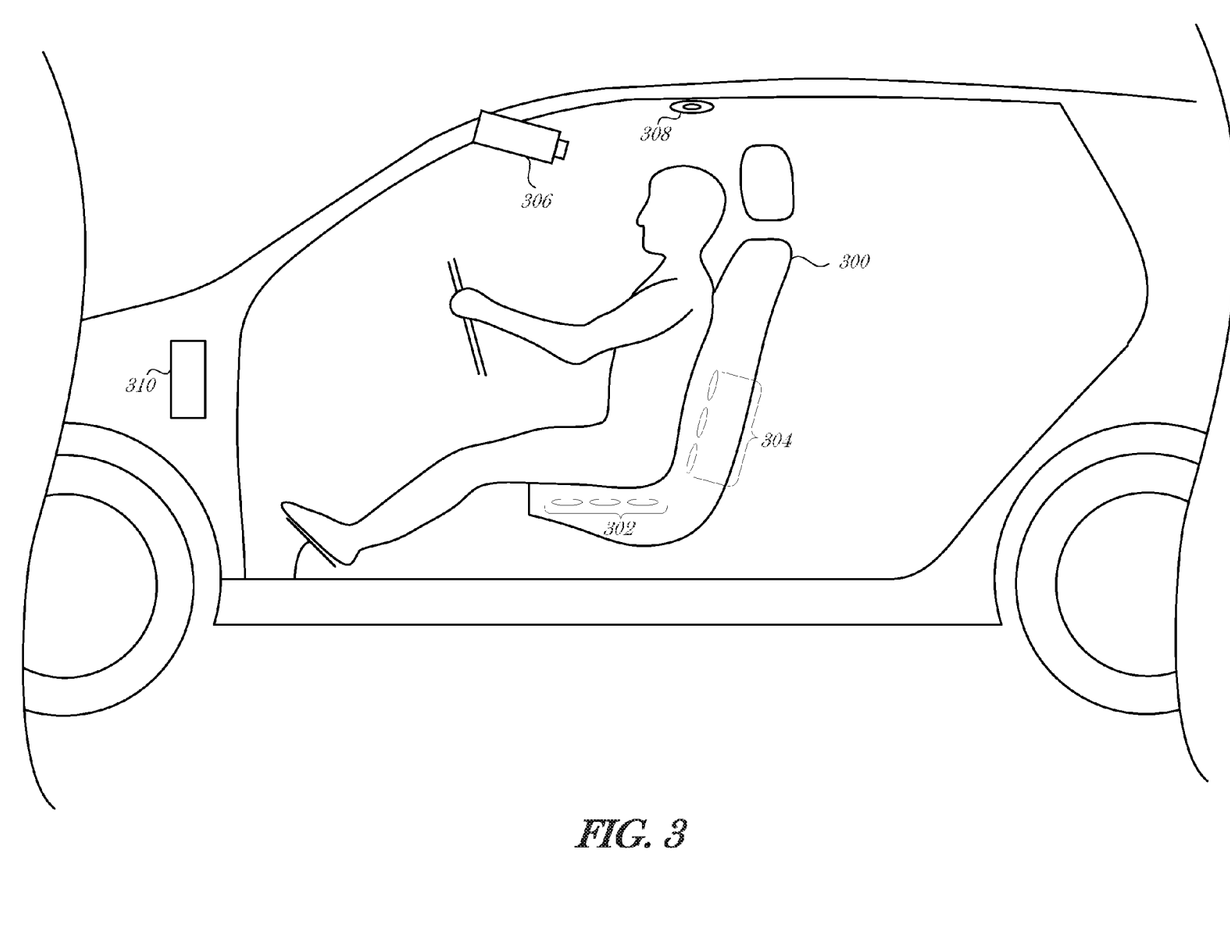
FIG. 3 is a schematic view of a vehicle seat and surrounding environment, according to an embodiment.

FIG. 3 is a schematic view of a vehicle seat and surrounding environment, according to an embodiment. The vehicle seat illustrated in FIG. 3 is a driver's seat 300 (e.g., driver's seat 200 of FIG. 2). Only one seat is illustrated in FIG. 3 to simplify the discussion. It is understood that additional seats may be equipped with similar sensors and that the systems and methods described herein may operate with such similarly equipped seats.

The seat 300 includes a base cushion sensor arrangement 302 and a backrest sensor arrangement 304. The base cushion sensor arrangement 302 may be arranged in a pattern, such as a 3×3 or a 4×4 matrix, depending on the number of sensors installed. The pattern may be useful to provide a more refined sensor signature. Although not optimal, a single sensor may be used in the base cushion sensor arrangement 302. Similarly, in the backrest sensor arrangement 304, a number of sensors may be arranged in a pattern, such as a 3×3, 4×3, 5×5, or other matrix. Also, the base cushion sensor arrangement 302 or the backrest sensor arrangement 304 may use an asymmetrical arrangement of sensors.

The environment includes a camera system 306, which may include one or more cameras. The cameras in the camera system 306 may include a visible light camera, an infrared camera, a depth camera, or other imaging mechanisms. One camera system 306 may be used to observe all of the occupants of the vehicle. Alternatively, multiple camera systems 306 may be installed to provide coverage.

The environment also includes one or more height detectors 308. The vehicle may include at least one height detector 308 for each seating position. The height detector 308 may be implemented using various technologies, including but not limited to an ultrasonic sensor, an infrared sensor, a camera, radar, light-based radar (e.g., LIDAR), or other distance measuring mechanism. The height detector 308 determines the distance from the point of installation (e.g., the headliner of the vehicle) to the top of the object in the seat under the height detector 308. The distance is used to determine an approximate height of the object in the seat.

A sensor fusion circuit 310 may be communicatively coupled to the sensors in the base cushion sensor arrangement 302, sensors in the backrest sensor arrangement 304, and the height detectors 308. The sensor fusion circuit 310 may be connected using a wired bus, such as a CANbus, or a wireless bus, such as a Bluetooth network. Using the values from the various sensors, the sensor fusion circuit 310 compares the measured sensor values to reference values in an attempt to identify the person sitting in a particular seat.

Figure 4:
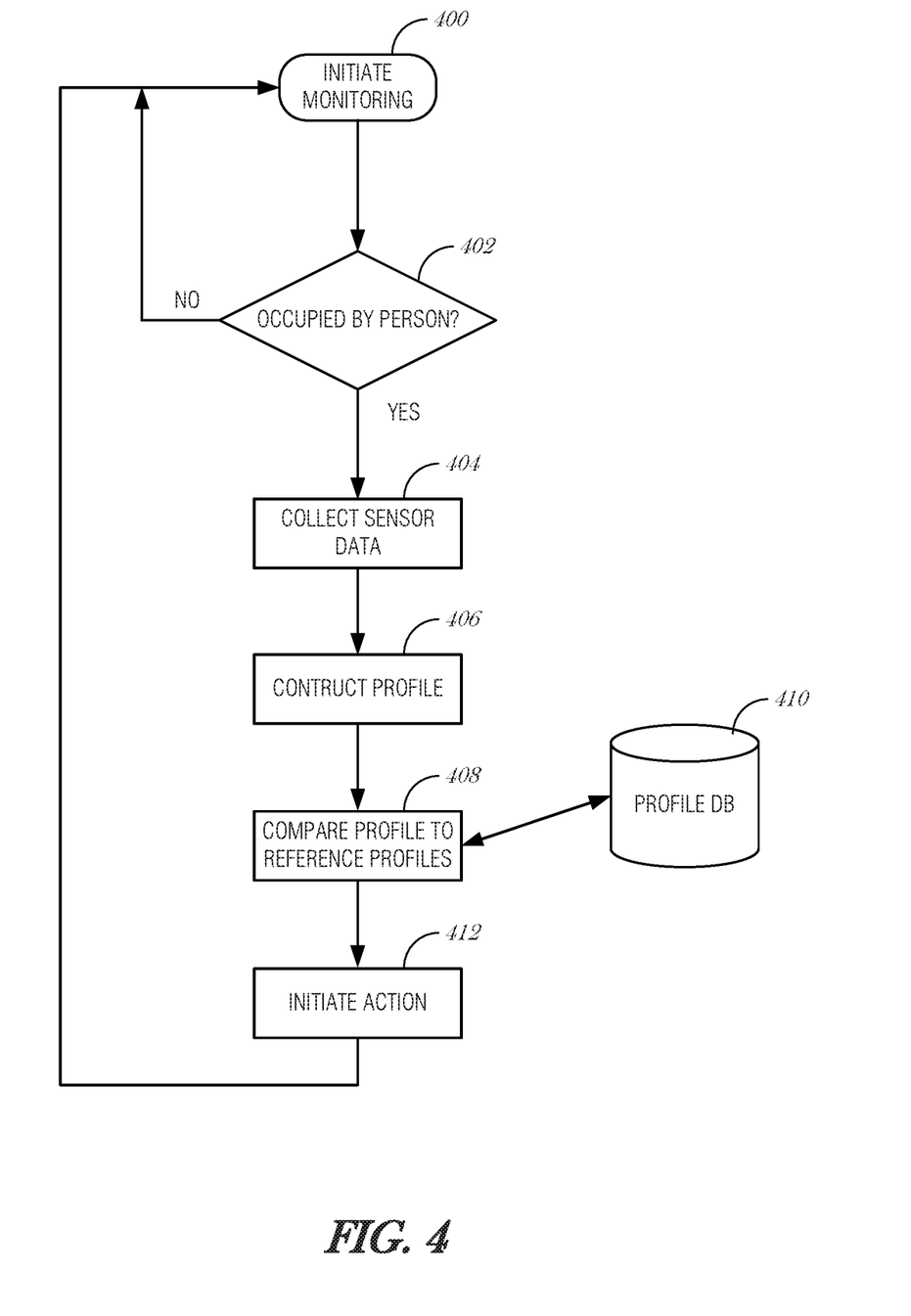
FIG. 4 is a diagram illustrating data and control flow in a process to profile an occupant, according to an embodiment.

FIG. 4 is a diagram illustrating data and control flow in a process to profile an occupant, according to an embodiment. At operation 400, the data and control flow initiate and the vehicle begins monitoring its environment. Monitoring may be implemented, at least in part, using sensors installed on or in the vehicle.

If a seat is occupied by a person (decision 402), then sensor information is gathered from sensors monitoring the seat (operation 404). The determination of whether the seat is occupied by a person may be performed using a camera (e.g., with face detection), a base cushion seat sensor (e.g., detecting weight on the seat), or by other mechanisms (e.g., a heat sensor, audio sensing, etc.). In an embodiment, occupancy detection is performed with two operations, a first operation to detect weight on the seat and a second operation to activate a camera and perform facial detection. By using the weight detection first, the more computationally expensive operation of facial detection may be avoided. Using the facial detection, the system is able to positively determine that a person is in the seat, and not just a box or some other object.

The height sensor data, backrest seat data, and base cushion seat data are used to construct a profile of the person sitting in the seat (operation 406). The profile is compared to reference profiles (operation 408), which may be accessed from a profile database 410.

A reference profile is a baseline used to identify the person. The reference profile may be measured or initialized when the person first uses the system. For example, the person may be instructed by the vehicle's infotainment system to sit in a comfortable, natural position, at which point the sensor fusion circuit (e.g., circuit 310) may measure seat sensor and height sensor data to construct the reference profile for that person. The reference profile is then used at later times when the person uses the vehicle again. The person may revise or replace a reference profile, such as when the person gains or loses weight, ages, or otherwise needs to recreate a reference profile.

If the person in the seat is recognized (e.g., the profile correlates to a reference profile), then an action is initiated (operation 412). The action may be of various types, such as setting driver controls to a preset configuration, adjusting climate controls, loading radio stations, activating or deactivating airbags or other restraint systems, or otherwise configuring the vehicle.

Figure 5:
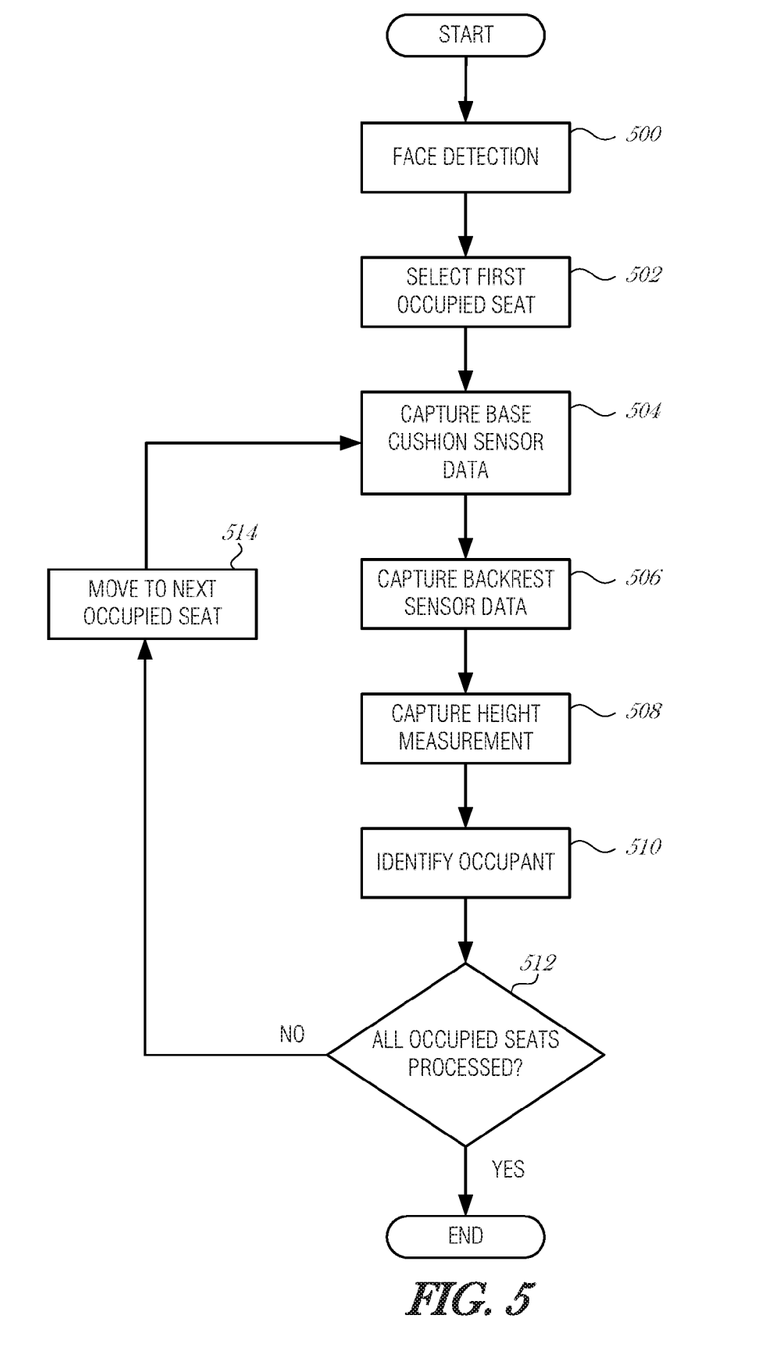
FIG. 5 is a flowchart illustrating a process of occupant profiling, according to an embodiment.

FIG. 5 is a flowchart illustrating a process of occupant profiling, according to an embodiment. At 500, face detection is performed. The purpose of this operation is to detect the seat locations where there is a human occupant, in order to avoid redundant processing. Face detection process is a computationally costly operation. Therefore, in some embodiments, to improve the overall efficiency of the detection process, if the base cushion sensor, backrest sensor, or height detector sensor indicate an empty seat, the face detection operation for that particular seat may be skipped thereby saving computational overhead.

Face detection may include several sub-operations including activating a camera, obtaining an image using the camera, executing face detection on the image, storing indices of seats with human occupants, and deactivating the camera. The seating positions of the vehicle may be preconfigured and associated with indices, such as—0=driver's seat, 1=front passenger seat, 2=rear left seat, 3=rear center seat, and 4=rear right seat.

The first occupied seat is selected (operation 502). The pressure sensors of the base cushion sensor arrangement are read and the data are processed (operation 504). For the purposes of this discussion, the base cushion sensor arrangement will be referred to as a base cushion matrix (BCM). As discussed above, the BCM may be any arrangement of sensors, such as a 3×3 matrix, a 4×4 matrix, etc. Note these pressure values may be converted into weight through a calibration function, which is not explained here.

In an illustrative example, the BCM is assumed to be arranged as a 3×3 sensor array per seat. Assume that the reference profiles are available for each occupant, in each seat. For example, a person "Dave" may calibrate the system by sitting in each seat in the vehicle and storing a reference profile for each seat. Alternatively, Dave may only store a reference profile for the most frequently used seat, such as the driver's seat if Dave is lives along or only drives around by himself, for example.

Let $A_{ij}^n$ represent the BCM reference profile for some user n, where n is an element of the set N, which is the set of all users known to the vehicle. In a typical car, n is in the range [1,5]. The upper limit may be higher depending on the number of people who access a vehicle, the number of seats in a vehicle, etc. The reference profile $A_{ij}^n$ is scaled by the maximum to normalize the matrix elements to 1. Let $K_{ij}$ be the sampled BCM when an occupant is under evaluation. Again, the elements of $K_{ij}$ are also normalized to 1. The sample profile $K_{ij}$ and the reference profile $A_{ij}^n$ are combined using the sum of dot products, as shown in Equation 1, where x and y are the upper limits of the rows and columns in the matrix of sensors.

$$U^n = \sum_{i=0}^{x} \sum_{j=0}^{y} K_{ij} \cdot A_{ij}^n \quad \text{Equation 1}$$

In an example arrangement of sensors with a 3×3 matrix, x and y would be set to the value 2 so that the sums iterate over the range [0,2] for each of the rows and columns in the matrix. It is understood that the sensors may be arranged in various arrangements and that the values of x and y will be adjusted accordingly based on the arrangement.

The last processing part in operation 504 is to correlate the captured pressure/weight measurements with references to obtain the "degree of likeness." The initialization or calibration that produced the references was discussed above. For this example, it is simply assumed that calibration references for occupants are already available.

The pressure sensors of the backrest sensor arrangement are read and the data are processed (operation 506). For the purposes of this discussion, the backrest sensor arrangement will be referred to as the backrest matrix (BRM). As discussed above, the BRM may be any arrangement of sensors, such as a 3×3 matrix, a 4×4 matrix, etc. Note these pressure values may be converted into weight through a calibration function, which is not explained here.

The processing of the sensor values is similar to that described in operation 504. However, for the BRM the reference value for user n is represented by $B_{ij}^n$. When the BRM is sampled, another matrix profile $L_{ij}$ is created. Each of $B_{ij}^n$ and $L_{ij}$ are normalized to 1. The sample profile $L_{ij}$ and the reference profile $B_{ij}^n$ are combined using the sum of dot products, as shown in Equation 2, where x and y are the upper limits of the rows and columns in the matrix of sensors.

$$V^n = \sum_{i=0}^{x} \sum_{j=0}^{y} L_{ij} \cdot B_{ij}^n \quad \text{Equation 2}$$

At operation 508, the height measurement is captured. The height measurement may be represented by measuring a distance between the top of the person's head and the ceiling (or position of the sensor) and is referred to as "HED" for this discussion. The measurement may be obtained using an ultrasonic sensor or other type of distance measurement sensor.

A reference array $C^n$ includes distance measurements for each user n in the particular seat under test. Let M represent the sampled distance measurement obtained at operation 508. A difference array $W^n$ may be calculated for each value in the reference array $C^n$. Prior to calculation of $W^n$, M and $C^n$ may be normalized to 1 based on max(M, $C^n$). The difference array is calculated using Equation 3.

$$W_n = |M - C^n| \quad \text{Equation 3}$$

At operation 510, an attempt to identify the occupant is made. In operation 510, confidence values for each seat/occupant allocation scenario is calculated. There are three components that contribute to the confidence values: BCM confidence (Cnf(BCM)), BRM confidence (Cnf(BRM)), and HED confidence (Cnf(HED)). The confidence values for each of the BCM, BRM, and HED are combined in a weighted formula, as expressed in Equation 4.

$$Cnf(TOT) = K_1 Cnf(BCM) + K_2 Cnf(BRM) + K_3 Cnf(HED) \quad \text{Equation 4}$$

Coefficients $K_1$, $K_2$, and $K_3$ provide a way to tune the performance and calibrate the confidence output. Typically, these coefficients are all equal and because their sum needs to be equal to unity, e.g., $K_1 = K_2 = K_3 = \frac{1}{3}$. Coefficients may be modified for particular vehicles, occupants, sensor types, or other features to account for variances in measurements, seating position, or other variables.

The calculation of Cnf(BCM) and Cnf(BRM) are similar. For Cnf(BMC), the perfect correlation (e.g., autocorrelation) case is calculated using Equation 5 and the confidence of BCM for the sample under analysis is represented with Equation 6 below. The autocorrelation case for Cnf(BCM) is $$U_{auto}^n = \sum_{i=0}^{x} \sum_{j=0}^{y} A_{ij}^n \cdot A_{ij}^n \quad \text{Equation 5}$$

where x and y are the upper limits of the rows and columns in the matrix of sensors and the confidence is expressed with $$Cnf(BCM)^n = \frac{U^n}{U_{auto}^n} \quad \text{Equation 6}$$

Similarly, for Cnf(BRM), the autocorrelation case is expressed with $$V_{auto}^n = \sum_{i=0}^{x} \sum_{j=0}^{y} B_{ij}^n \cdot B_{ij}^n \quad \text{Equation 7}$$

where x and y are the upper limits of the rows and columns in the matrix of sensors and the confidence is expressed with $$Cnf(BRM)^n = \frac{V^n}{V_{auto}^n} \quad \text{Equation 8}$$

The autocorrelation value may be initialized by the occupant, for example, during the first use of the particular seat. The system may prompt the person to sit in a comfortable position, then sample the sensor values (height, seat, etc.) and create a baseline set of values. Several measurements may be taken and averaged. When the person changes the seat position (e.g., raises or lowers the seat, reclines, or moves the seat forward/backward, etc.), the system may request the person to create a new baseline set of values in the new seat position. Similarly, if the person's physical attributes change (e.g., ages, gains/loses weight), then the person may initiate a new baseline initialization procedure. Such re-initialization may be useful for children as they grow, adults as they lose weight, or other similar situations. The autocorrelation values for all users may be stored for easier access when performing operations discussed above.

The calculation of Cnf(HED) is determined with Equation 9 for occupant n in a particular seat. For a different seat, the same calculation of Equation 9 is performed using the distance metric measured for that seat. As such, the confidence of the height measurement is calculated with $$Cnf(HED)^n = 1 - W^n \qquad \text{Equation 9}$$

At operation 512, it is determined whether all occupied seats have been processed. If so, then the process ends. Otherwise, the process moves to operation 514, where the next occupied seat comes under analysis and the operations 504-510 are executed.

As an illustrative example, assume that there are three regular occupants of the vehicle. In this example, N=3. Each occupant has a representative $A_{ij}{}^n$ BCM reference profile. In operation 504 from above, the sampled profile of user n from the set of N is $K_{ij}$ and is compared is used with each occupant profile $A_{ij}{}^n$ to compute a corresponding $U^n$, according to Equation 1. Each $U^n$ is then used in Equation 6, to determine a confidence of whether the current sample profile is the occupant profile $A_{ij}{}^n$, for each n in N={1,2,3}.

Similarly, each occupant has a representative $B_{ij}{}^n$ BRM reference profile. In operation 506 from above, the sampled profile $L_{ij}$ is used with each occupant profile $B_{ij}{}^n$ to compute a corresponding $v^n$, according to Equation 2. Each $V^n$ is then used in Equation 8, to determine a confidence of whether the current sample profile is the occupant profile $B_{ij}{}^n$, for each n in N={1,2,3}.

The confidence of the BCM, BRM, and HED are then aggregated to determine a total confidence (Equation 4) that the sampled occupant under analysis is a particular user n of the set N. The reference profile with the highest total confidence value is then inferred to be the person most likely seated in the vehicle seat.

Figure 6:
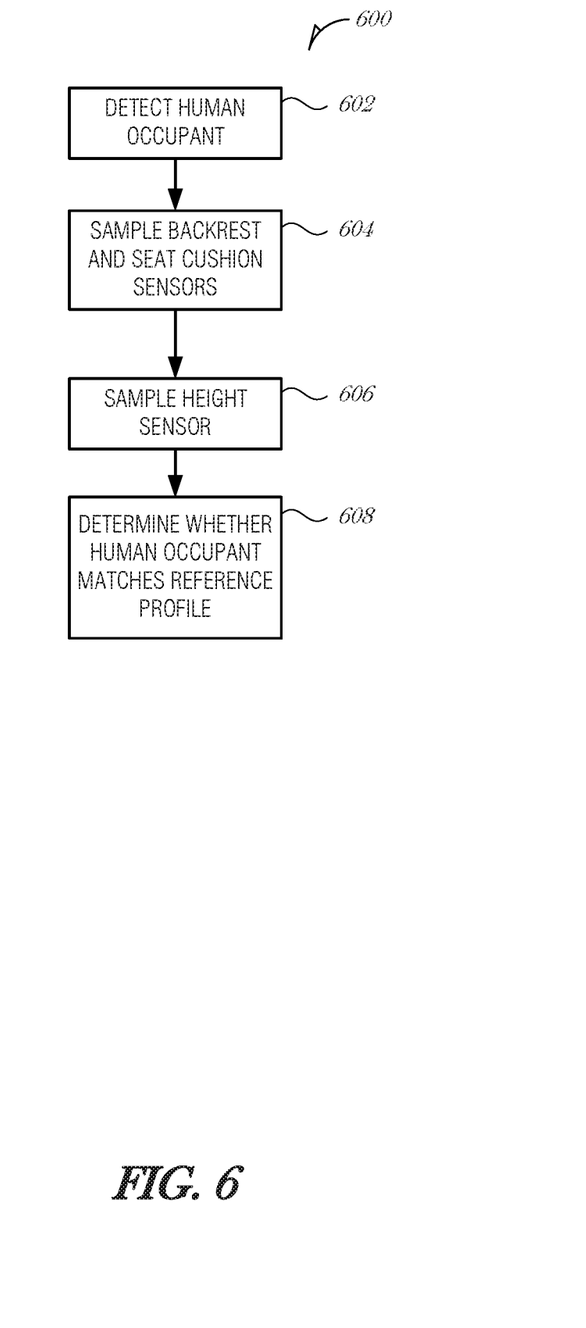
FIG. 6 is a flowchart illustrating a method of profiling a vehicle occupant, according to an embodiment.

FIG. 6 is a flowchart illustrating a method 600 of profiling a vehicle occupant, according to an embodiment. At block 602, it is determined that a human occupant is seated in a vehicle seat. In an embodiment, determining that the human occupant is seated in the vehicle seat includes obtaining an image of the vehicle seat, and using a facial detection process on the image to determine whether a face is present in the image. Using facial detection is less computationally costly than using facial recognition. However, there is still a computational cost. As such, in some implementations, the image analysis is performed conditionally upon some precondition, such as using a weight sensor in a seat to determine whether anything is in the seat. Thus, in a further embodiment, the method 600 includes conditionally using the facial detection process when the base cushion sensor data indicates that more than a threshold weight is on the vehicle seat. The threshold weight may be user defined. The threshold weight may be 20 pounds in an example, which corresponds to at least an infant in a car seat. Objects weighing less than the threshold weight may be disregarded and assumed to not be a person for the sake of this analysis.

At block 604, a sensor fusion circuit samples a backrest sensor arrangement and a base cushion sensor arrangement of the vehicle seat to obtain backrest sensor data and base cushion sensor data, when the human occupant is determined to be seated in the vehicle seat. The backrest sensor arrangement may be a grid or a matrix arrangement or any number of rows and columns, such as a 3×3, 4×4, 2×4, or 5×4 arrangement of sensors. Similarly, the base cushion sensor arrangement may be arranged as a grid or matrix using any number of rows or columns in the arrangement. The base cushion sensors are arranged on the bottom or substantially horizontal portion of a vehicle seat and the backrest sensors are arranged on the back or substantially vertical portion of the vehicle seat.

At block 606, the sensor fusion circuit samples a height sensor to obtain a height sensor value, when the human occupant is determined to be seated in the vehicle seat. In an embodiment, the height sensor comprises an ultrasonic sensor. Other types of sensors may be used as well, such as infrared sensors. In an embodiment, the height sensor value comprises a distance between the height sensor and an upper portion of the human occupant.

At block 608, it is statistically determined from the backrest sensor data, the base cushion sensor data, and the high sensor data, whether the human occupant matches a reference profile.

In an embodiment, the reference profile comprises a reference backrest sensor data set, a reference base cushion sensor data set, and a reference height sensor data set. In such an embodiment, statistically determining whether the human occupant matches the reference profile includes 1) obtaining a backrest confidence value indicating the likelihood that the backrest sensor data corresponds to the reference backrest sensor data set; 2) obtaining a base cushion confidence value indicating the likelihood that the base cushion sensor data corresponds to the reference base cushion sensor data set; 3) obtaining a height confidence value indicating the likelihood that the seat height sensor data corresponds to the reference height sensor data set; and 4) aggregating the backrest confidence value, the base cushion confidence value, and the height confidence value to obtain a total confidence value.

In an embodiment, the backrest sensor data comprises a set of sensor values corresponding to a plurality of sensors in the backrest sensor arrangement. In a further embodiment, obtaining the backrest confidence value includes calculating a sum of sums of dot products of the set of sensor values corresponding to the plurality of sensors in the backrest sensor arrangement and a set of sensor values corresponding to the reference backrest sensor data set, and comparing the sum of sums with a sum of sums of the set of sensor values corresponding to the reference backrest sensor data set with itself. An example is illustrated in Equations 2, 7, and 8 above.

In an embodiment, the base cushion sensor data comprises a set of sensor values corresponding to a plurality of sensors in the base cushion sensor arrangement. In a further embodiment, obtaining the base cushion confidence value includes calculating a sum of sums of dot products of the set of sensor values corresponding to the plurality of sensors in the base cushion sensor arrangement and a set of sensor values corresponding to the reference base cushion sensor data set, and comparing the sum of sums with a sum of sums of the set of sensor values corresponding to the reference base cushion sensor data set with itself. An example is illustrated in Equations 1, 5, and 6 above.

In an embodiment, obtaining the height confidence value includes calculating a difference of the height sensor data and the reference height sensor data and using the difference to determine the height confidence value. An example is illustrated in Equations 3 and 9 above.

In an embodiment, aggregating the backrest, base cushion, and height confidence values comprises aggregating the backrest, base cushion, and height confidence values in a weighted function. An example is illustrated in Equation 4 above.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 7:
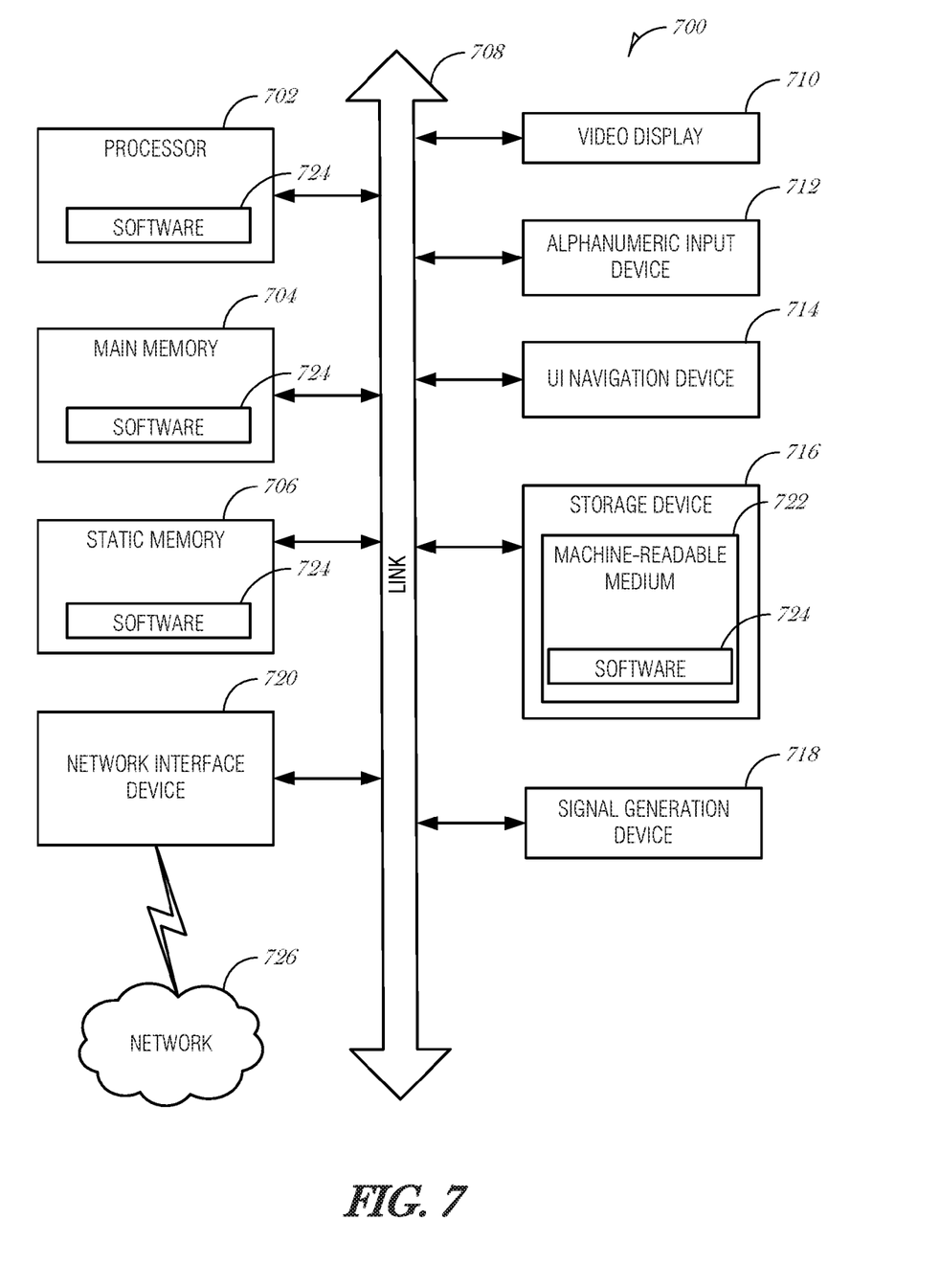
FIG. 7 is a block diagram illustrating an example machine upon which any one or more of the techniques (e.g., methodologies) discussed herein may perform, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for profiling a vehicle occupant, the system comprising: a vehicle control system, comprising: a sensor fusion circuit coupled to a plurality of sensors installed a vehicle seat, the sensor fusion circuit to: determine that a human occupant is seated in the vehicle seat; sample a backrest sensor arrangement and a base cushion sensor arrangement of the vehicle seat to obtain backrest sensor data and base cushion sensor data, when the human occupant is determined to be seated in the vehicle seat; sample, when the human occupant is determined to be seated in the vehicle seat, a height sensor to obtain a height sensor value; and statistically determine from the backrest sensor data, the base cushion sensor data, and the high sensor data, whether the human occupant matches a reference profile.

In Example 2, the subject matter of Example 1 optionally includes wherein to determine that the human occupant is seated in the vehicle seat, the sensor fusion circuit is to: interface with an image processor, the image processor coupled to a camera array interface and operable to: obtain an image of the vehicle seat; and use a facial detection process on the image to determine whether a face is present in the image.

In Example 3, the subject matter of Example 2 optionally includes wherein the image processor is to conditionally use the facial detection process when the base cushion sensor data indicates that more than a threshold weight is on the vehicle seat.

In Example 4, the subject matter of any one or more of Examples 1-3 optionally include wherein the height sensor comprises an ultrasonic sensor.

In Example 5, the subject matter of any one or more of Examples 1-4 optionally include wherein the height sensor value comprises a distance between the height sensor and an upper portion of the human occupant.

In Example 6, the subject matter of any one or more of Examples 1-5 optionally include wherein the reference profile comprises a reference backrest sensor data set, a reference base cushion sensor data set, and a reference height sensor data set, and wherein to statistically determine whether the human occupant matches the reference profile, the sensor fusion circuit is to: obtain a backrest confidence value indicating the likelihood that the backrest sensor data corresponds to the reference backrest sensor data set; obtain a base cushion confidence value indicating the likelihood that the base cushion sensor data corresponds to the reference base cushion sensor data set; obtain a height confidence value indicating the likelihood that the seat height sensor data corresponds to the reference height sensor data set; and aggregate the backrest confidence value, the base cushion confidence value, and the height confidence value to obtain a total confidence value.

In Example 7, the subject matter of Example 6 optionally includes wherein the backrest sensor data comprises a set of sensor values corresponding to a plurality of sensors in the backrest sensor arrangement.

In Example 8, the subject matter of Example 7 optionally includes wherein to obtain the backrest confidence value, the sensor fusion circuit is to: calculate a sum of sums of dot products of the set of sensor values corresponding to the plurality of sensors in the backrest sensor arrangement and a set of sensor values corresponding to the reference backrest sensor data set; and compare the sum of sums with a sum of sums of the set of sensor values corresponding to the reference backrest sensor data set with itself.

In Example 9, the subject matter of any one or more of Examples 6-8 optionally include wherein the base cushion sensor data comprises a set of sensor values corresponding to a plurality of sensors in the base cushion sensor arrangement.

In Example 10, the subject matter of Example 9 optionally includes wherein to obtain the base cushion confidence value, the sensor fusion circuit is to: calculate a sum of sums of dot products of the set of sensor values corresponding to the plurality of sensors in the base cushion sensor arrangement and a set of sensor values corresponding to the reference base cushion sensor data set; and compare the sum of sums with a sum of sums of the set of sensor values corresponding to the reference base cushion sensor data set with itself.

In Example 11, the subject matter of any one or more of Examples 6-10 optionally include wherein to obtain the height confidence value, the sensor fusion circuit is to: calculate a difference of the height sensor data and the reference height sensor data; and use the difference to determine the height confidence value.

In Example 12, the subject matter of any one or more of Examples 1-11 optionally include wherein to aggregate the backrest, base cushion, and height confidence values, the sensor fusion circuit is to: aggregate the backrest, base cushion, and height confidence values in a weighted function.

Example 13 is a method of profiling a vehicle occupant, the method comprising: determining that a human occupant is seated in a vehicle seat; sampling, at a sensor fusion circuit, a backrest sensor arrangement and a base cushion sensor arrangement of the vehicle seat to obtain backrest sensor data and base cushion sensor data, when the human occupant is determined to be seated in the vehicle seat; sampling, at the sensor fusion circuit when the human occupant is determined to be seated in the vehicle seat, a height sensor to obtain a height sensor value; and statistically determining from the backrest sensor data, the base cushion sensor data, and the high sensor data, whether the human occupant matches a reference profile.

In Example 14, the subject matter of Example 13 optionally includes wherein determining that the human occupant is seated in the vehicle seat comprises: obtaining an image of the vehicle seat; and using a facial detection process on the image to determine whether a face is present in the image.

In Example 15, the subject matter of Example 14 optionally includes conditionally using the facial detection process when the base cushion sensor data indicates that more than a threshold weight is on the vehicle seat.

In Example 16, the subject matter of any one or more of Examples 13-15 optionally include wherein the height sensor comprises an ultrasonic sensor.

In Example 17, the subject matter of any one or more of Examples 13-16 optionally include wherein the height sensor value comprises a distance between the height sensor and an upper portion of the human occupant.

In Example 18, the subject matter of any one or more of Examples 13-17 optionally include wherein the reference profile comprises a reference backrest sensor data set, a reference base cushion sensor data set, and a reference height sensor data set, and wherein statistically determining whether the human occupant matches the reference profile comprises: obtaining a backrest confidence value indicating the likelihood that the backrest sensor data corresponds to the reference backrest sensor data set; obtaining a base cushion confidence value indicating the likelihood that the base cushion sensor data corresponds to the reference base cushion sensor data set; obtaining a height confidence value indicating the likelihood that the seat height sensor data corresponds to the reference height sensor data set; and aggregating the backrest confidence value, the base cushion confidence value, and the height confidence value to obtain a total confidence value.

In Example 19, the subject matter of Example 18 optionally includes wherein the backrest sensor data comprises a set of sensor values corresponding to a plurality of sensors in the backrest sensor arrangement.

In Example 20, the subject matter of Example 19 optionally includes wherein obtaining the backrest confidence value comprises: calculating a sum of sums of dot products of the set of sensor values corresponding to the plurality of sensors in the backrest sensor arrangement and a set of sensor values corresponding to the reference backrest sensor data set; and comparing the sum of sums with a sum of sums of the set of sensor values corresponding to the reference backrest sensor data set with itself.

In Example 21, the subject matter of any one or more of Examples 18-20 optionally include wherein the base cushion sensor data comprises a set of sensor values corresponding to a plurality of sensors in the base cushion sensor arrangement.

In Example 22, the subject matter of Example 21 optionally includes wherein obtaining the base cushion confidence value comprises: calculating a sum of sums of dot products of the set of sensor values corresponding to the plurality of sensors in the base cushion sensor arrangement and a set of sensor values corresponding to the reference base cushion sensor data set; and comparing the sum of sums with a sum of sums of the set of sensor values corresponding to the reference base cushion sensor data set with itself.

In Example 23, the subject matter of any one or more of Examples 18-22 optionally include wherein obtaining the height confidence value comprises: calculating a difference of the height sensor data and the reference height sensor data; and using the difference to determine the height confidence value.

In Example 24, the subject matter of any one or more of Examples 13-23 optionally include wherein aggregating the backrest, base cushion, and height confidence values comprises: aggregating the backrest, base cushion, and height confidence values in a weighted function.

Example 25 is at least one machine-readable medium including instructions, which when executed by a machine, cause the machine to perform operations of any of the methods of Examples 13-24.

Example 26 is an apparatus comprising means for performing any of the methods of Examples 13-24.

Example 27 is at least one machine-readable medium including instructions for profiling a vehicle occupant, which when executed by a machine, cause the machine to determine that a human occupant is seated in a vehicle seat; sample, at a sensor fusion circuit, a backrest sensor arrangement and a base cushion sensor arrangement of the vehicle seat to obtain backrest sensor data and base cushion sensor data, when the human occupant is determined to be seated in the vehicle seat; sample, at the sensor fusion circuit when the human occupant is determined to be seated in the vehicle seat, a height sensor to obtain a height sensor value; and statistically determine from the backrest sensor data, the base cushion sensor data, and the high sensor data, whether the human occupant matches a reference profile.

In Example 28, the subject matter of Example 27 optionally includes wherein the instructions to determine that the human occupant is seated in the vehicle seat comprise instructions to: obtain an image of the vehicle seat; and use a facial detection process on the image to determine whether a face is present in the image.

In Example 29, the subject matter of Example 28 optionally includes instructions to conditionally using the facial detection process when the base cushion sensor data indicates that more than a threshold weight is on the vehicle seat.

In Example 30, the subject matter of any one or more of Examples 27-29 optionally include wherein the height sensor comprises an ultrasonic sensor.

In Example 31, the subject matter of any one or more of Examples 27-30 optionally include wherein the height sensor value comprises a distance between the height sensor and an upper portion of the human occupant.

In Example 32, the subject matter of any one or more of Examples 27-31 optionally include wherein the reference profile comprises a reference backrest sensor data set, a reference base cushion sensor data set, and a reference height sensor data set, and wherein the instructions to statistically determine whether the human occupant matches the reference profile comprise instructions to: obtain a backrest confidence value indicating the likelihood that the backrest sensor data corresponds to the reference backrest sensor data set; obtain a base cushion confidence value indicating the likelihood that the base cushion sensor data corresponds to the reference base cushion sensor data set; obtain a height confidence value indicating the likelihood that the seat height sensor data corresponds to the reference height sensor data set; and aggregate the backrest confidence value, the base cushion confidence value, and the height confidence value to obtain a total confidence value.

In Example 33, the subject matter of Example 32 optionally includes wherein the backrest sensor data comprises a set of sensor values corresponding to a plurality of sensors in the backrest sensor arrangement.

In Example 34, the subject matter of Example 33 optionally includes wherein the instructions to obtain the backrest confidence value comprise instructions to: calculate a sum of sums of dot products of the set of sensor values corresponding to the plurality of sensors in the backrest sensor arrangement and a set of sensor values corresponding to the reference backrest sensor data set; and compare the sum of sums with a sum of sums of the set of sensor values corresponding to the reference backrest sensor data set with itself.

In Example 35, the subject matter of any one or more of Examples 32-34 optionally include wherein the base cushion sensor data comprises a set of sensor values corresponding to a plurality of sensors in the base cushion sensor arrangement.

In Example 36, the subject matter of Example 35 optionally includes wherein the instructions to obtain the base cushion confidence value comprise instructions to: calculate a sum of sums of dot products of the set of sensor values corresponding to the plurality of sensors in the base cushion sensor arrangement and a set of sensor values corresponding to the reference base cushion sensor data set; and compare the sum of sums with a sum of sums of the set of sensor values corresponding to the reference base cushion sensor data set with itself.

In Example 37, the subject matter of any one or more of Examples 32-36 optionally include wherein the instructions to obtain the height confidence value comprise instructions to: calculate a difference of the height sensor data and the reference height sensor data; and use the difference to determine the height confidence value.

In Example 38, the subject matter of any one or more of Examples 27-37 optionally include wherein the instructions to aggregate the backrest, base cushion, and height confidence values comprise instructions to: aggregate the backrest, base cushion, and height confidence values in a weighted function.

Example 39 is a apparatus for profiling a vehicle occupant, the apparatus comprising: means for determining that a human occupant is seated in a vehicle seat; means for sampling, at a sensor fusion circuit, a backrest sensor arrangement and a base cushion sensor arrangement of the vehicle seat to obtain backrest sensor data and base cushion sensor data, when the human occupant is determined to be seated in the vehicle seat; means for sampling, at the sensor fusion circuit when the human occupant is determined to be seated in the vehicle seat, a height sensor to obtain a height sensor value; and means for statistically determining from the backrest sensor data, the base cushion sensor data, and the high sensor data, whether the human occupant matches a reference profile.

In Example 40, the subject matter of Example 39 optionally includes wherein determining that the human occupant is seated in the vehicle seat comprise: means for obtaining an image of the vehicle seat; and means for using a facial detection process on the image to determine whether a face is present in the image.

In Example 41, the subject matter of Example 40 optionally includes means for conditionally using the facial detection process when the base cushion sensor data indicates that more than a threshold weight is on the vehicle seat.

In Example 42, the subject matter of any one or more of Examples 39-41 optionally include wherein the height sensor comprises an ultrasonic sensor.

In Example 43, the subject matter of any one or more of Examples 39-42 optionally include wherein the height sensor value comprises a distance between the height sensor and an upper portion of the human occupant.

In Example 44, the subject matter of any one or more of Examples 39-43 optionally include wherein the reference profile comprises a reference backrest sensor data set, a reference base cushion sensor data set, and a reference height sensor data set, and wherein the means for statistically determining whether the human occupant matches the reference profile comprise: means for obtaining a backrest confidence value indicating the likelihood that the backrest sensor data corresponds to the reference backrest sensor data set; means for obtaining a base cushion confidence value indicating the likelihood that the base cushion sensor data corresponds to the reference base cushion sensor data set; means for obtaining a height confidence value indicating the likelihood that the seat height sensor data corresponds to the reference height sensor data set; and means for aggregating the backrest confidence value, the base cushion confidence value, and the height confidence value to obtain a total confidence value.

In Example 45, the subject matter of Example 44 optionally includes wherein the backrest sensor data comprises a set of sensor values corresponding to a plurality of sensors in the backrest sensor arrangement.

In Example 46, the subject matter of Example 45 optionally includes wherein the means for obtaining the backrest confidence value comprise: means for calculating a sum of sums of dot products of the set of sensor values corresponding to the plurality of sensors in the backrest sensor arrangement and a set of sensor values corresponding to the reference backrest sensor data set; and means for comparing the sum of sums with a sum of sums of the set of sensor values corresponding to the reference backrest sensor data set with itself.

In Example 47, the subject matter of any one or more of Examples 44-46 optionally include wherein the base cushion sensor data comprises a set of sensor values corresponding to a plurality of sensors in the base cushion sensor arrangement.

In Example 48, the subject matter of Example 47 optionally includes wherein the means for obtaining the base cushion confidence value comprise: means for calculating a sum of sums of dot products of the set of sensor values corresponding to the plurality of sensors in the base cushion sensor arrangement and a set of sensor values corresponding to the reference base cushion sensor data set; and means for comparing the sum of sums with a sum of sums of the set of sensor values corresponding to the reference base cushion sensor data set with itself.

In Example 49, the subject matter of any one or more of Examples 44-48 optionally include wherein the means for obtaining the height confidence value comprise: means for calculating a difference of the height sensor data and the reference height sensor data; and means for using the difference to determine the height confidence value.

In Example 50, the subject matter of any one or more of Examples 39-49 optionally include wherein the means for aggregating the backrest, base cushion, and height confidence values comprise: means for aggregating the backrest, base cushion, and height confidence values in a weighted function.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for profiling a vehicle occupant, the system comprising:
   a vehicle control system, comprising:
      a sensor fusion circuit coupled to a plurality of sensors installed a vehicle seat, the sensor fusion circuit to:
      determine that a human occupant is seated in the vehicle seat;
      sample a backrest sensor arrangement and a base cushion sensor arrangement of the vehicle seat to obtain backrest sensor data and base cushion sensor data, when the human occupant is determined to be seated in the vehicle seat;
      sample, when the human occupant is determined to be seated in the vehicle seat, a height sensor to obtain height sensor data; and
      statistically determine from the backrest sensor data, the base cushion sensor data, and the height sensor data, whether the human occupant matches a reference profile, the reference profile used as a baseline to identify the human occupant.

2. The system of claim 1, wherein to determine that the human occupant is seated in the vehicle seat, the sensor fusion circuit is to:
   interface with an image processor, the image processor coupled to a camera array interface and operable to:
      obtain an image of the vehicle seat; and
      use a facial detection process on the image to determine whether a face is present in the image.

3. The system of claim 2, wherein the image processor is to conditionally use the facial detection process when the base cushion sensor data indicates that more than a threshold weight is on the vehicle seat.

4. The system of claim 1, wherein the height sensor comprises an ultrasonic sensor.

5. The system of claim 1, wherein the height sensor data comprises a distance between the height sensor and an upper portion of the human occupant.

6. The system of claim 1, wherein the reference profile comprises a reference backrest sensor data set, a reference base cushion sensor data set, and a reference height sensor data set, and wherein to statistically determine whether the human occupant matches the reference profile, the sensor fusion circuit is to:
   obtain a backrest confidence value indicating the likelihood that the backrest sensor data corresponds to the reference backrest sensor data set;
   obtain a base cushion confidence value indicating the likelihood that the base cushion sensor data corresponds to the reference base cushion sensor data set;
   obtain a height confidence value indicating the likelihood that the seat height sensor data corresponds to the reference height sensor data set; and
   aggregate the backrest confidence value, the base cushion confidence value, and the height confidence value to obtain a total confidence value.

7. The system of claim 6, wherein the backrest sensor data comprises a set of sensor values corresponding to a plurality of sensors in the backrest sensor arrangement.

8. The system of claim 7, wherein to obtain the backrest confidence value, the sensor fusion circuit is to:
   calculate a sum of sums of dot products of the set of sensor values corresponding to the plurality of sensors in the backrest sensor arrangement and a set of sensor values corresponding to the reference backrest sensor data set; and
   compare the sum of sums with a sum of sums of the set of sensor values corresponding to the reference backrest sensor data set with itself.

9. The system of claim 6, wherein the base cushion sensor data comprises a set of sensor values corresponding to a plurality of sensors in the base cushion sensor arrangement.

10. The system of claim 9, wherein to obtain the base cushion confidence value, the sensor fusion circuit is to:
    calculate a sum of sums of dot products of the set of sensor values corresponding to the plurality of sensors in the base cushion sensor arrangement and a set of sensor values corresponding to the reference base cushion sensor data set; and
    compare the sum of sums with a sum of sums of the set of sensor values corresponding to the reference base cushion sensor data set with itself.

11. The system of claim 6, wherein to obtain the height confidence value, the sensor fusion circuit is to:
    calculate a difference of the height sensor data and the reference height sensor data; and
    use the difference to determine the height confidence value.

12. The system of claim 1, wherein to aggregate the backrest, base cushion, and height confidence values, the sensor fusion circuit is to:
  aggregate the backrest, base cushion, and height confidence values in a weighted function.

13. A method of profiling a vehicle occupant, the method comprising:
  determining that a human occupant is seated in a vehicle seat;
  sampling, at a sensor fusion circuit, a backrest sensor arrangement and a base cushion sensor arrangement of the vehicle seat to obtain backrest sensor data and base cushion sensor data, when the human occupant is determined to be seated in the vehicle seat;
  sampling, at the sensor fusion circuit when the human occupant is determined to be seated in the vehicle seat, a height sensor to obtain height sensor data; and
  statistically determining from the backrest sensor data, the base cushion sensor data, and the height sensor data, whether the human occupant matches a reference profile, the reference profile used as a baseline to identify the human occupant.

14. The method of claim 13, wherein determining that the human occupant is seated in the vehicle seat comprises:
  obtaining an image of the vehicle seat; and
  using a facial detection process on the image to determine whether a face is present in the image.

15. The method of claim 14, further comprising conditionally using the facial detection process when the base cushion sensor data indicates that more than a threshold weight is on the vehicle seat.

16. The method of claim 13, wherein the height sensor comprises an ultrasonic sensor.

17. The method of claim 13, wherein the height sensor data comprises a distance between the height sensor and an upper portion of the human occupant.

18. The method of claim 13, wherein the reference profile comprises a reference backrest sensor data set, a reference base cushion sensor data set, and a reference height sensor data set, and wherein statistically determining whether the human occupant matches the reference profile comprises:
  obtaining a backrest confidence value indicating the likelihood that the backrest sensor data corresponds to the reference backrest sensor data set;
  obtaining a base cushion confidence value indicating the likelihood that the base cushion sensor data corresponds to the reference base cushion sensor data set;
  obtaining a height confidence value indicating the likelihood that the seat height sensor data corresponds to the reference height sensor data set; and
  aggregating the backrest confidence value, the base cushion confidence value, and the height confidence value to obtain a total confidence value.

19. The method of claim 13, wherein aggregating the backrest, base cushion, and height confidence values comprises:
  aggregating the backrest, base cushion, and height confidence values in a weighted function.

20. At least one non-transitory machine-readable medium including instructions for profiling a vehicle occupant, which when executed by a machine, cause the machine to:
  determine that a human occupant is seated in a vehicle seat;
  sample, at a sensor fusion circuit, a backrest sensor arrangement and a base cushion sensor arrangement of the vehicle seat to obtain backrest sensor data and base cushion sensor data, when the human occupant is determined to be seated in the vehicle seat;
  sample, at the sensor fusion circuit when the human occupant is determined to be seated in the vehicle seat, a height sensor to obtain height sensor data; and
  statistically determine from the backrest sensor data, the base cushion sensor data, and the height sensor data, whether the human occupant matches a reference profile, the reference profile used as a baseline to identify the human occupant.

21. The at least one machine-readable medium of claim 20, wherein the instructions to determine that the human occupant is seated in the vehicle seat comprise instructions to:
  obtain an image of the vehicle seat; and
  use a facial detection process on the image to determine whether a face is present in the image.

22. The at least one machine-readable medium of claim 21, further comprising instructions to conditionally using the facial detection process when the base cushion sensor data indicates that more than a threshold weight is on the vehicle seat.

23. The at least one machine-readable medium of claim 20, wherein the reference profile comprises a reference backrest sensor data set, a reference base cushion sensor data set, and a reference height sensor data set, and wherein the instructions to statistically determine whether the human occupant matches the reference profile comprise instructions to:
  obtain a backrest confidence value indicating the likelihood that the backrest sensor data corresponds to the reference backrest sensor data set;
  obtain a base cushion confidence value indicating the likelihood that the base cushion sensor data corresponds to the reference base cushion sensor data set;
  obtain a height confidence value indicating the likelihood that the seat height sensor data corresponds to the reference height sensor data set; and
  aggregate the backrest confidence value, the base cushion confidence value, and the height confidence value to obtain a total confidence value.

24. The at least one machine-readable medium of claim 23, wherein the backrest sensor data comprises a set of sensor values corresponding to a plurality of sensors in the backrest sensor arrangement.

25. The at least one machine-readable medium of claim 24, wherein the instructions to obtain the backrest confidence value comprise instructions to:
  calculate a sum of sums of dot products of the set of sensor values corresponding to the plurality of sensors in the backrest sensor arrangement and a set of sensor values corresponding to the reference backrest sensor data set; and
  compare the sum of sums with a sum of sums of the set of sensor values corresponding to the reference backrest sensor data set with itself.

* * * * *